2 Sheets—Sheet 1.

S. ROSS.

SOLE TRIMMING MACHINE.

No. 11,602. Reissued May 25, 1897.

Attest—
C. W. Miles.
Oliver B. Kaiser.

Inventor—
Simon Ross
By Woods & Bond, attys

THE NORRIS PETERS CO., PHOTO-LITHO., WASHINGTON, D. C.

2 Sheets—Sheet 2.

S. ROSS.

SOLE TRIMMING MACHINE.

No. 11,602. Reissued May 25, 1897.

Attest—
C. W. Miles
Oliver B. Kaiser

Inventor—
Simon Ross
By Wood & Boyd
Attys.

THE NORRIS PETERS CO., PHOTO-LITHO., WASHINGTON, D. C.

UNITED STATES PATENT OFFICE.

SIMON ROSS, OF CINCINNATI, OHIO.

SOLE-TRIMMING MACHINE.

SPECIFICATION forming part of Reissued Letters Patent No. 11,602, dated May 25, 1897.

Original No. 472,399, dated April 5, 1892. Application for reissue filed March 31, 1894. Serial No. 505,981.

*To all whom it may concern:*

Be it known that I, SIMON ROSS, a citizen of the United States, and a resident of Cincinnati, in the county of Hamilton and State of Ohio, have invented certain new and useful Improvements in Sole-Trimming Machines, of which the following is a specification.

One of the objects of my invention is to produce a machine that will trim or shape from what is known as "blocked stock" a sole or tap to any predetermined size from a given pattern.

Another object of my invention is to clamp the stock and pattern together and arrange them in close relation with a pattern-guide supported in juxtaposition to the cutter, thereby preventing variation of the sole from the pattern, due to lateral strain or lost motion.

Another object of my invention is to provide a revoluble clamp and pattern mounted upon a shaft, which is turned and presented to the cutter by the operator, who varies the feed as the need of the stock requires.

Another object of my invention is to mount the guide on a shifting slide, so it can be adjusted to the different sizes required by means of an adjusting-screw, and a lever can be made use of when the amount of material is great enough to require two cuts.

The various features of my invention are fully set forth in the description of the accompanying drawings, making a part of this specification, in which—

Figure 2:
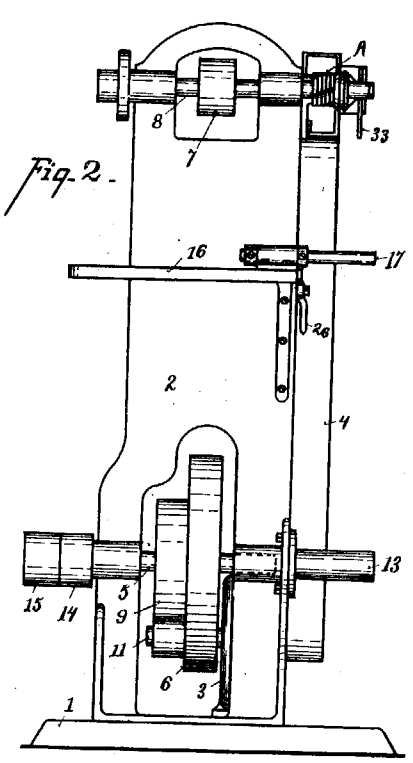
Figure 1:
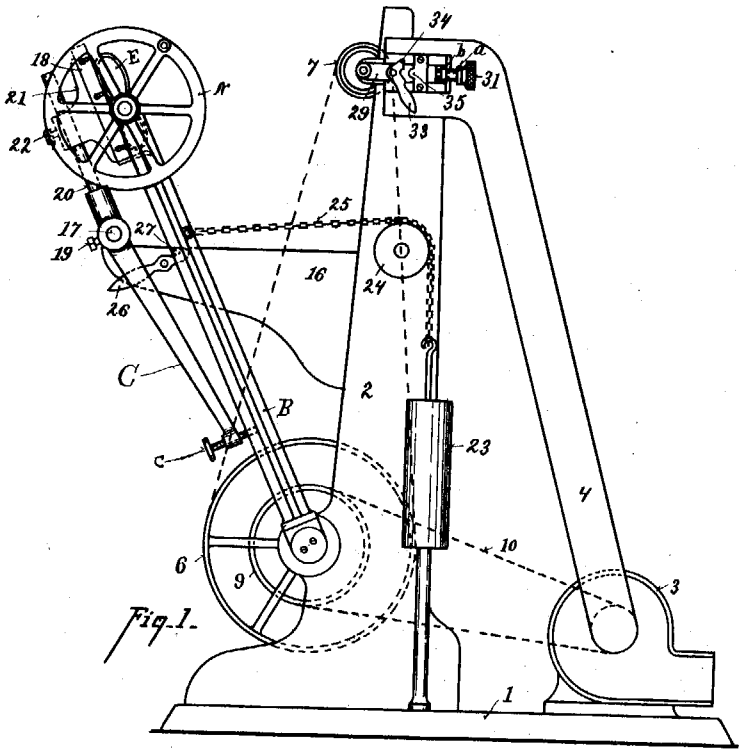
Figure 3:
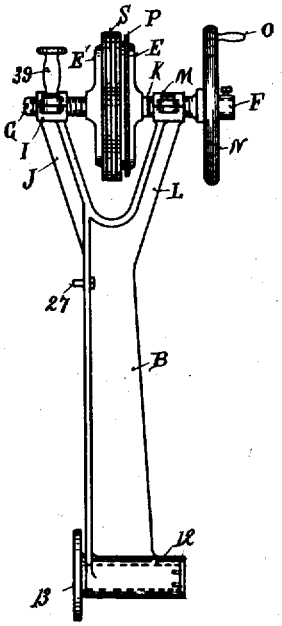
Figure 4:
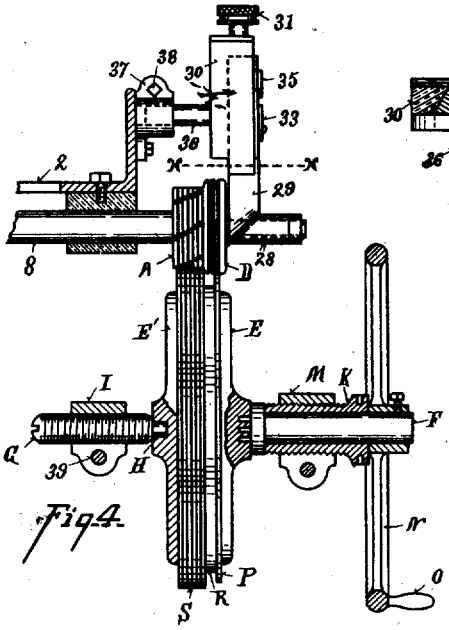
Figure 7:
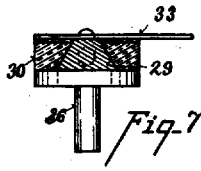
Figure 5:
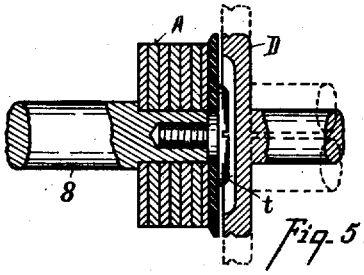
Figure 8:
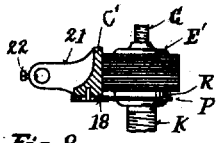
Figure 6:
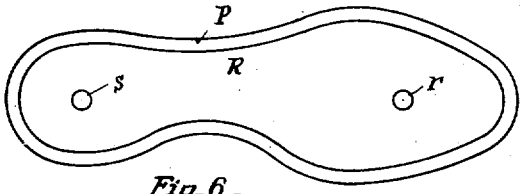
Figure 9:
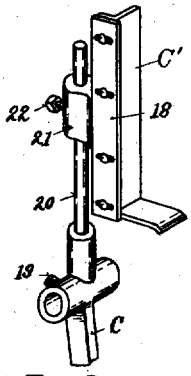

Figure 1 is a side elevation of my improved sole trimming or shaping machine. Fig. 2 is a front elevation of the main frame and cutter. Fig. 3 is a front elevation of the jack-frame. Fig. 4 is an enlarged top plan view, partly in section, of the cutter-head and clamping device. Fig. 5 is an enlarged sectional elevation of the cutter-head and guide. Fig. 6 is a plan view of the pattern and spacing-plate. Fig. 7 is a section on line *x x*, Fig. 4. Fig. 8 is a sectional detail view. Fig. 9 is a perspective of the fence.

1 represents the bed-plate of the machine; 2, the main frame, mounted thereon.

3 represents a blower; 4, a dust-tube.

5 represents the main driving-shaft; 6, the main driving-pulley. This main driving-pulley transmits power to pulleys 7 on the cutter-shaft 8.

9 represents a second pulley mounted on the main shaft 5 and transmitting power by the belt 10 to the pulley on the blower-shaft 11.

A represents the cutter-head, mounted on shaft 8. The knives or bits may be of any well-known form of construction.

B represents a jack-frame provided with a sleeve 12, that journals on stud-shaft 13. (See Fig. 2.)

14 represents a driving-pulley on the main shaft 5, and 15 represents a loose pulley on the same shaft.

16 represents a table, on the bracket of which is loosely mounted a stud-shaft 17, so as to be capable of oscillating in its bearing.

C represents a fence-rod journaled on the stud-shaft 17, and C′ represents a stock-gage supported on said fence-rod.

The numeral 18 represents a pattern-gage which is adjustable radially to the axis of the pattern.

*c* represents a set-screw for adjusting both gages radially to the stock and pattern.

22 represents a set-screw for adjusting the gages vertically.

19 represents a set-screw for engaging the gages laterally to the pattern. The stock-gage and the pattern-gage thus arranged are supported upon the main frame through the table 16 and form an element of said main frame. As thus arranged, the jack-frame B oscillates during operation between the cutter 7 and the stock and pattern gages C′ and 18.

23 represents a weight attached to a chain passing over the sheave 24, one end of said chain 25 being secured to the weight 23 and the other end secured to the jack-frame. The weight normally draws the jack-frame forward to the cutter-shaft. It is held back by means of the catch-lever 26, the end of which engages on the stud 27 on the jack-frame.

D represents a grooved guide which journals in the sleeve 28. 29 represents a slide supporting said sleeve and gained into a guide-box 30.

31 represents a set-screw for adjusting the slide 29 to carry the guide D forward and backward for adjusting it to different sizes of work required.

*a b* represent collars on the shank of the screw 31 to limit the forward-and-backward movement of the slide 29. It may be desired to throw this guide forward at times in order to reduce the extent of cut when it is required to make two cuts instead of one in reducing the stock. This is accomplished by moving the shipping-lever 33 so as to spring the catch 34 in engagement with the lug 35 and thus hold the guide in its most advanced position. When the shipping-lever is moved backward, the slide 29 is free to move backward.

E E′ represent clamping-heads. The clamp E is mounted upon the stud-shaft F, and the clamp E′ is mounted upon the gudgeon H of a screw-shaft G. The shaft G is screw-threaded through a split box I, supported upon the fork J of the jack-frame B.

K represents a sleeve supported on the fork L. This sleeve is screw-threaded through the boxing M, so that said sleeve may be adjusted longitudinally.

N represents a hand-wheel secured to shaft F.

O represents a handle secured to the rim of the wheel and may be operated to turn the said shaft and revolve the clamp-heads E E′.

R represents a spacing-plate provided with holes *r s* to pass over dowel-pins projecting from the clamping-head E. P represents a pattern provided with similar holes and placed between the spacing-plate R and the clamping-head E.

S represents stock clamped by the clamping-heads E E′. This construction enables the clamping-heads E E′ to be used for various sizes of work, but the clamping-heads may be changed, if desired, as they are readily detachable from their supporting-gudgeons. The clamping-heads are driven by the hand-wheel N, which is turned by the operator to present the stock to the action of the cutter. Important advantages are obtained by this means, as the operator can turn the clamping-heads fast or slow, presenting the stock to the cutter no faster than it will reduce it. Thus if stock for the soles of a child's shoe is being reduced there is much less stock to be cut away and it can be revolved faster; but if a large size—say the sole of a man's shoe—is to be reduced there is much more stock to be reduced, and it must travel a longer distance during the revolution and much more stock is taken off by the cutter, and a slower motion is required to avoid overfeeding. Another important advantage is obtained by arranging and clamping the pattern close up to the stock to be reduced and the guide close to the cutter-head and having the pattern and clamp supported on one and the same shaft and close together, as an accurate feed of successive charges of stock may be obtained, and they are trimmed to the exact size of the pattern P, which travels in the groove of the guide D, the guide being close to the cutter-head and the stock close to the pattern.

In Fig. 5 I have shown the guide D recessed out, so as to span the screw-head *t*, which clamps the cutters on the shaft 8. In order that the guide D may be readily moved out of the way to take off the cutter-head, I mount the guide-box 30 on the shaft 36, where it is held in position by the clamping-box 37, and 38 represents a clamping-screw which is loosened to allow the said guide-box to be turned up or down, removing the guide out of the path of the cutter-head. In order to set the screw-shaft G in a fixed position, it passes through the split box I, where it is secured in position by set-screw 39, so that said shaft G may be turned to clamp the heads E E′ and then set by the screw 39 to hold it in a fixed position. The clamping-head E forms the base on which the pattern P rests, and it must be adjusted exactly to the groove in guide D. This adjustment is secured by turning the sleeve K in box M, so as to move the clamping-head E and the pattern laterally to secure the alinement. The spacing-plate R keeps the pattern P a sufficient distance away from the cutter to prevent the pattern from interfering with the action of the cutter and allowing the inner edge of the stock to be completely trimmed down.

Having described my invention, what I claim is—

1. In a sole-trimming machine, the combination, with a jack-frame carrying the stock and pattern clamped in proximity to each other, of a rotary cutter-head and a guide mounted in close juxtaposition to said cutter-head and provided with a peripheral groove to receive the pattern, substantially as specified.

2. In a sole-trimming machine, the combination with a jack-frame carrying the stock and pattern clamped in proximity to each other, of a rotary cutter-head, a guide mounted in close juxtaposition to said cutter-head and provided with a peripheral groove to receive the pattern, and an adjustable slide in which said guide is supported, substantially as specified.

3. In a sole-trimming machine, the combination of the grooved guide D, journaled upon the adjustable slide 29, and the adjusting-lever 33 for moving said guide to or from the clamping-head, substantially as specified.

4. In combination with the rotary cutter-head A, the revoluble grooved guide D, the sleeve 28, in which said guide is journaled, the slide 29, that supports said sleeve, and the guide-box 30, mounted upon a shaft 36 and adapted to be adjusted to or from the plane of the cutter-head, substantially as specified.

5. In a sole-trimming machine, the combination, with the rotary cutter-head A and pattern-guide D, mounted in close juxtaposition to each other, of an oscillating frame having the shaft G F journaled therein, and the heads E E′, mounted on said shafts and adapted to clamp the pattern and stock in proximity to each other and hold them in line with said guide and cutter-head, substantially as described.

6. In combination with the rotary cutter-head A and the grooved guide D, held in juxtaposition thereto, the shafts G F, journaled in an oscillatory frame, and the clamping-heads E E′, mounted on said shafts in close proximity to the cutter-head and laterally adjustable on said shaft, whereby the stock and pattern held by said clamps can be respectively alined to the cutter-head and guide, substantially as specified.

7. In combination with a rotary cutter-head, the clamping-heads E E′, the spacing-blank R, the pattern P, the clamping-shaft G, and the revoluble shaft F for clamping the stock and presenting the same to the action of the cutter, substantially as specified.

8. In combination with a rotary cutter, the clamping-heads E E′, the former journaled upon a revoluble shaft and the latter upon the gudgeon-shaft G, which shaft is secured in the split box I, substantially as specified.

9. In combination with the continuously-revolving cutter-head A and a peripherally-grooved guide D, mounted close to said cutter-head, an oscillatory jack-frame provided with clamping-heads E E′ to hold the stock, the pattern P, clamped with the stock in position to be engaged by the peripherally-grooved guide, and the revoluble shaft K for turning the stock and pattern together at variable speed at the will of the operator, substantially as specified.

10. In combination with the main frame and a continuously-revolving cutter-head A and peripherally-grooved guide D, mounted on said frame in juxtaposition to each other, the jack-frame B, swiveled upon said main frame, the weight 23 for automatically holding the jack-frame forward, the shafts G F, journaled in said jack-frame, the clamping-heads E E′, mounted on said shafts and adapted to clamp the stock and pattern in proximity to each other and in line with the cutter-head and guide, and mechanism for oscillating the jack-frame and revolving the stock and pattern at the required speed at the will of the operator, substantially as specified.

11. A rounding-machine employing clamps for holding the stock and a pattern supported on the same center, in combination with a stock-gage, a pattern-gage, and means for adjusting said gages vertically, substantially as specified.

12. In a rounding-machine employing clamps for holding the stock, and means for holding the pattern supported on the same center, the combination with a stock-gage and a pattern-gage, and means for adjusting said gages radially, substantially as specified.

13. In combination with a rotary cutter-head, the swiveling jack-frame B, the fence C, mounted upon the center 17, the adjustable guide 18, and mechanism for adjusting said fence radially on its said center 17, substantially as specified.

14. In combination with a rotary cutter-head, the jack-frame B and the fence C, provided with the vertically-adjustable guide 18 upon the top and radially adjusted upon its center 17, substantially as specified.

15. In a rounding-machine, the combination with clamps for holding the stock, and a pattern, of a stock-gage and a pattern-gage supported on and forming an element of the main frame, and adapted to respectively bear against the stock and the pattern.

16. In a rounding-machine, the combination with clamps for holding the stock and means for holding the pattern on the same center as the stock, of a stock-gage and a pattern-gage supported on and forming an element of the main frame and adapted to respectively bear against the stock and pattern and means for adjusting the pattern-gage to the pattern.

17. In combination with the rotary cutter-head A, the adjustable guide D, provided with a groove in its periphery and journaled upon a stud-shaft at one side of the cutter-head and held in close proximity to the plane of the cutter, substantially as specified.

18. In combination with the cutter-head A, grooved guide D, clamping-heads E E′, and pattern P, the revoluble shaft F, on which one of said clamping-heads is mounted, the externally-screw-threaded sleeve K, in which said shaft is journaled, and the internally-screw-threaded boxing M, in which the sleeve K is adjustably supported, whereby the clamping-heads and pattern can be adjusted to bring said pattern in alinement with the groove in the periphery of the guide, substantially as described.

19. In combination with the rotary cutter-head A, the peripherally-grooved guide D, the clamps E E′, and the pattern-plate P, the slide 29, in which said guide D is journaled, and the screw 31, adapted to adjust said slide to carry the guide forward or back, substantially as described.

In testimony whereof I have hereunto set my hand.

SIMON ROSS.

Witnesses:
W. R. Wood,
T. Simmons.